May 2, 1944.   H. G. FERGUSON   2,347,898
HITCH MEANS FOR CONNECTING TRAILERS TO TRACTIVE VEHICLES
Filed July 31, 1940   5 Sheets-Sheet 4

May 2, 1944.     H. G. FERGUSON     2,347,898
HITCH MEANS FOR CONNECTING TRAILERS TO TRACTIVE VEHICLES
Filed July 31, 1940     5 Sheets-Sheet 5

Inventor
Henry G. Ferguson
By
Atty.

Patented May 2, 1944

2,347,898

UNITED STATES PATENT OFFICE 2,347,898

HITCH MEANS FOR CONNECTING TRAILERS TO TRACTIVE VEHICLES

Henry George Ferguson, Belfast, Northern Ireland
Application July 31, 1940, Serial No. 348,927
In Great Britain November 25, 1939

24 Claims. (Cl. 280—33.44)

This invention relates to hitch means for connecting trailable devices to tractive vehicles and especially for connecting two-wheeled or equivalent trailers to lightweight agricultural tractors, that is, for trailers which are not only drawn by the tractive vehicle but are also steadied or supported against tipping thereby.

An object of the invention is to provide a non-self-balancing trailable device, for example, a two-wheeled or equivalent non-self-balancing trailer adapted to receive a major part of its load in front of its ground wheels and connectible to the tractive vehicle or tractor by hitch means adapted to transfer the unbalanced weight of the trailer on to the tractor and preferably in front of the rear axle, the trailer being connected with lift means on the vehicle whereby an upward lift can be exerted on the trailer to cause a consequent increase in the downward pressure or tractive grip of the vehicle traction wheels.

A further object is to provide hitch means for connecting a non-self-balancing trailable device or trailer to a tractor having a lifting and lowering power unit so that the unbalanced weight of the trailer is transferred to the tractor and the trailer can laterally swing relatively to the tractor about a point giving the necessary clearance between the tractor and trailer for steering or turning, the trailer being connected with the lifting and lowering power unit on the tractor so that an upward lift can be exerted on the trailer to cause a consequent increase in the downward pressure or tractive grip of the tractor driving wheels.

A further object is to provide upper and lower link means for hitching a non-self-balancing trailable device or trailer to a tractor having a lifting and lowering power unit so that part of the trailer weight is transferred by the upper link means to the tractor and the trailer is capable of lateral swinging with reference to the tractor about a point giving the necessary clearance for steering or turning, the trailer being connected with the lifting and lowering power unit on the tractor so that an upward lift can be exerted on the trailer to cause a consequent increase in the downward pressure or tractive grip of the tractor driving wheels.

A further object is to provide a laterally spaced link attachment attachable at convenient points at the rear of the tractive vehicle behind the rear axle thereof but so directed that the trailer swings laterally with reference to the vehicle as if actually pivoted to the tractive vehicle forward of said points.

In order that the nature and objects of the invention will be clearly understood the following specific embodiments as applied to an agricultural tractor will now be described by way of example, with reference to the accompanying drawings in which.

Referring to the drawings, I denotes an agricultural tractor having two front wheels 2 and two rear driving wheels 3 and adapted for a three link connection substantially as disclosed, for example, in my prior Patent 2,223,002 dated November 26, 1940, for the agricultural implement which is carried by the tractor. In the drawings, 5 represents the two lower links which are universally connected to the tractor rear axle casing at 5ª. The upper link for the agricultural implement is not shown but is adapted to be connected at 6ᵇ to a double lever 6 of bell crank shape which is pivoted at 6ª on the rear of the tractor and connected to the rod 7 which is adapted to control the depth-regulating means as disclosed in the prior Patent 2,223,002. For the purpose of the present application it is not necessary to describe this means fully but it comprises an oil pump 8 (see Figures 6 and 7) driven by the tractor engine and adapted to supply oil to a ram (not shown) which controls raising and lowering of the links 5 through the crank arms 9 and drop links 10 (Figures 1 and 2) which are connected to the links 5. The linkage of the prior Patent 2,223,002 is adapted to allow lateral and vertical swinging of the implement.

In the attachment of a trailer in accordance with the present invention, check links 11 (shown in Figure 3 but omitted from Figure 2) are attached to the tractor and the links 5 to prevent the latter from swinging laterally and a drawbar 12 having a series of holes 12ª therein is connected across the outer ends of the links 5, being attached to the links by pins 12ᵇ thereon which engage through holes in universal balls 12ᶜ located in sockets in the links. These pins 12ᵇ also are engaged by holes in the ends of the check links 11 which are similarly attached at their forward ends on brackets 13 under the rear axle casing with pins 13ᵃ in horizontal alignment with the forward connections of the links 5. The upper link used for the agricultural implement is removed and replaced by a telescopic or adjustable link comprising a double part 14 embracing a single part 15, the said parts being clamped together by bolts 16 passing through holes in the double part and through slots 17 in the single part. The slots permit of the composite link being adjusted in length. A short link 18 is pivotally attached at the end of the double part 14 and is pivotally attached at the end 6ᵇ of one limb of the double bell crank lever 6. The end of the single part 15 is pivotally attached to a collar 19 turnably secured in an upper clevis 20 by a pin 21. The clevis 20 is mounted on a vertical composite frame member of the trailer comprising an upper part 22 engaging in a lower double part 23 and being adjustably held in position by bolts 24 engaging holes in the part 23 and slots 25 in the part 22, which slots determine the range of adjustment of the composite frame member. A lower clevis 26 is provided on the member 23 and is pivotally engageable with the drawbar 12 by means of a pin 27 which may be engaged in any selected hole 12ᵃ, the pins 21 and 27 being on the same vertical axis to permit swinging of the trailer about that axis relatively to the tractor for steering purposes. The vertical part 23 is secured between the converging end of two frame beams 28 connected by a transverse rear beam 29 to constitute the under frame of the trailer, the two road wheels 30 being located on the axle 30a at the rear of this frame. The vertical member 23 is braced by two struts 31 connected thereto by the bolt 24 and connected at their lower ends to the beams 28.

The load receptacle 32 is pivotally mounted at the rear of the under frame by means of a plate 33 on each of the longitudinal beams 33ᵃ engaged by a cross shaft 34 supported in brackets 35 on the beams 28.

Figure 2:
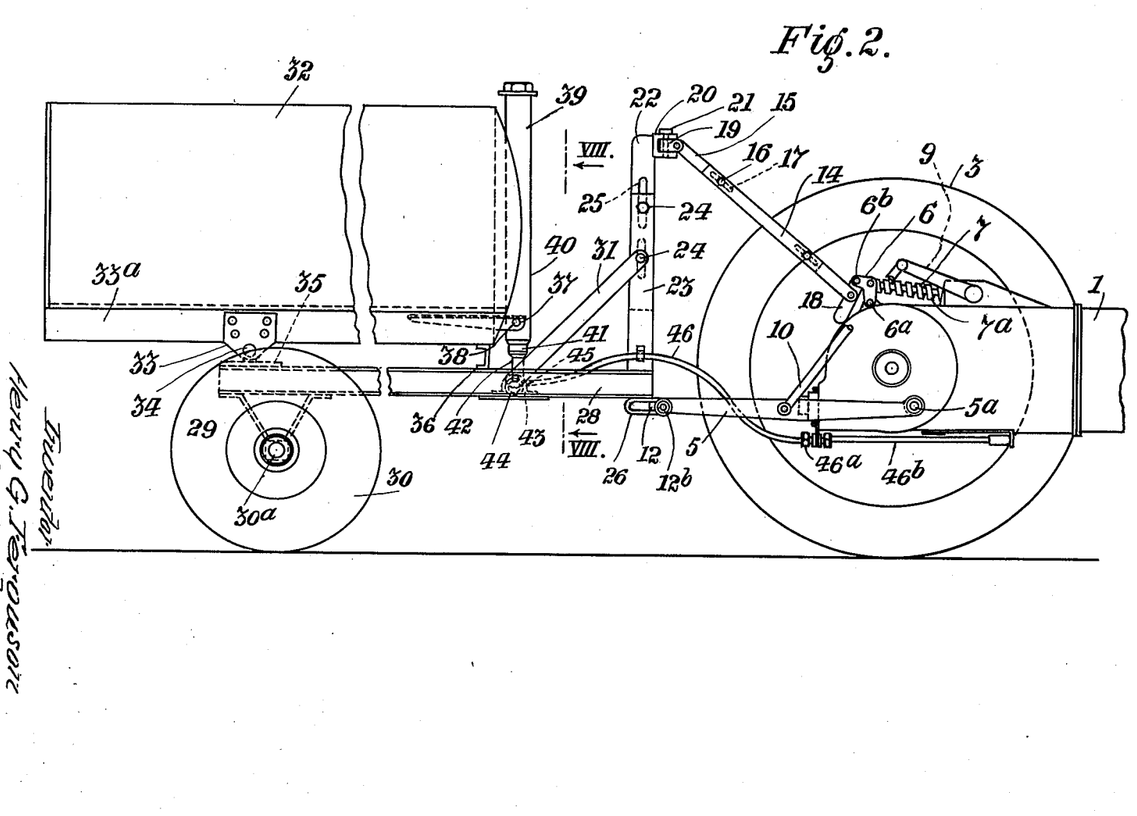
Figure 2 is a partial side elevation with parts of the tractor and trailer broken away and the near rear wheel of the tractor removed for clearness.
Figure 3:
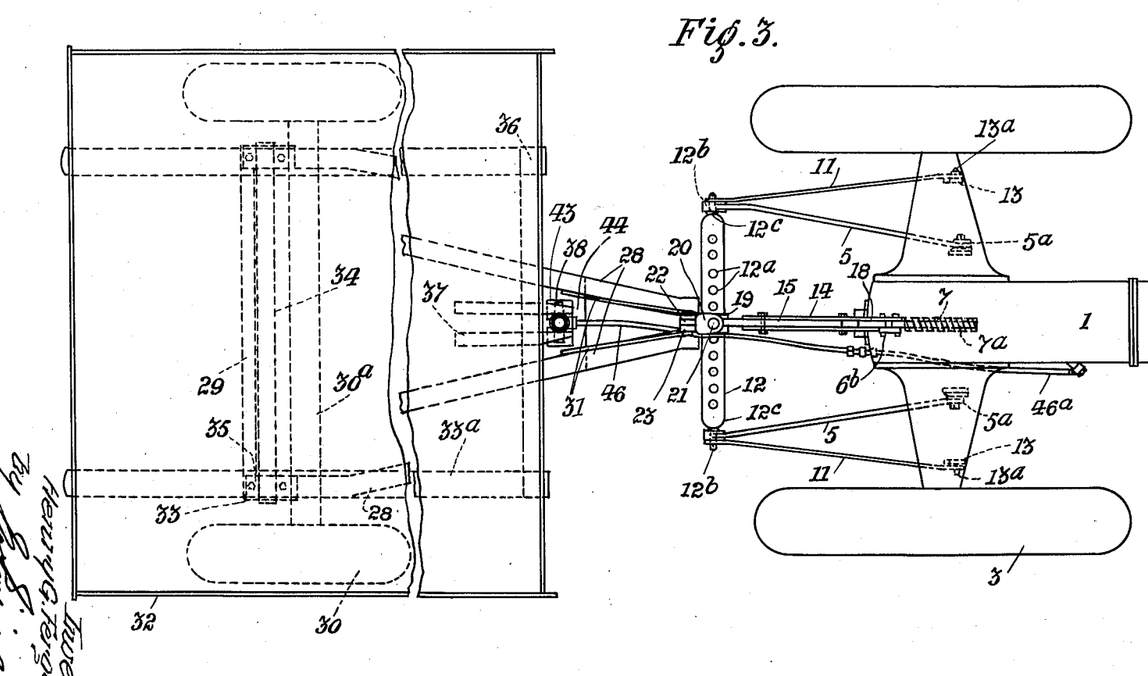
Figure 3 is a plan view corresponding to Figure 2.
Figure 4:
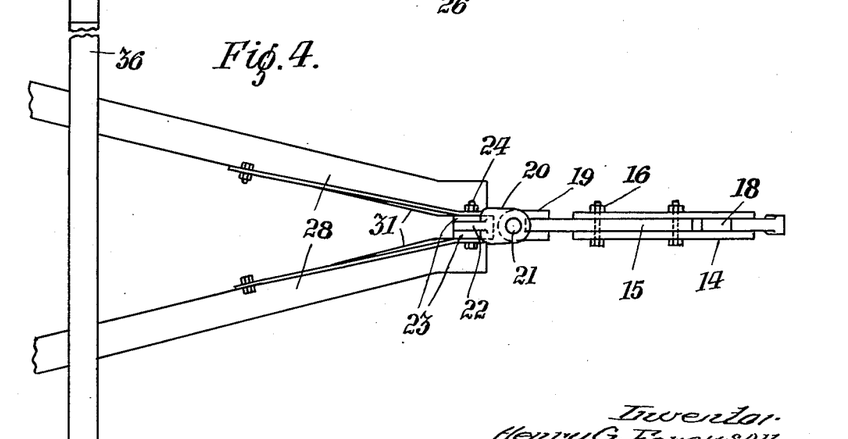
Figures 4 and 5 are respectively plan and side views to a larger scale of a part of the hitch connection between the tractor and the trailer.
Figure 5:
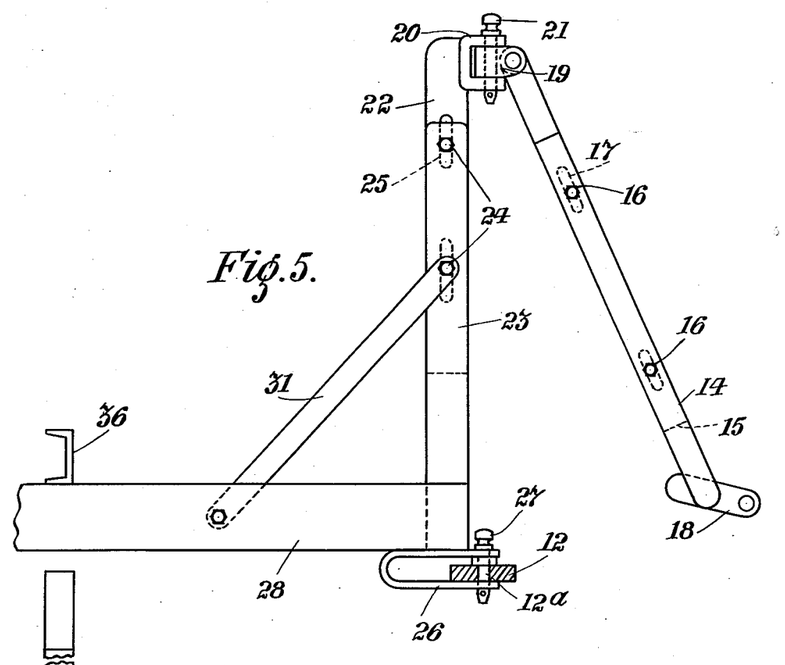

The front end of the receptacle normally rests on a cross beam 36 and is provided with two forwardly projecting brackets 37 pivotally engaged by cross pins 38 on the outer casing of a lifting ram 39 of known type giving a double lifting stroke and comprising three relatively slidable parts namely, an outer cylinder 40 and intermediate cylinder 41 and an inner plunger 42 (see Figure 2). The plunger 42 is pivotally supported by a T-end 45 engaging in brackets 43 supported on a cross plate 44. Oil is supplied to the T-end and ram 39 by means of a flexible conduit 46 connected by a detachable coupling 46ᵃ to a conduit 46ᵇ which is connected to an outlet port 46ᶜ at the delivery side of the oil pump 8 located inside the tractor casing. For the purpose of the present invention it is not necessary to describe the pump in detail but it is driven by a shaft 8ᵃ which is constantly driven by the tractor engine irrespective as to whether the tractor is in gear, that is, in actual motion, as for example, in my Patent 2,223,002.

Figures 1, 6, 7, 8:
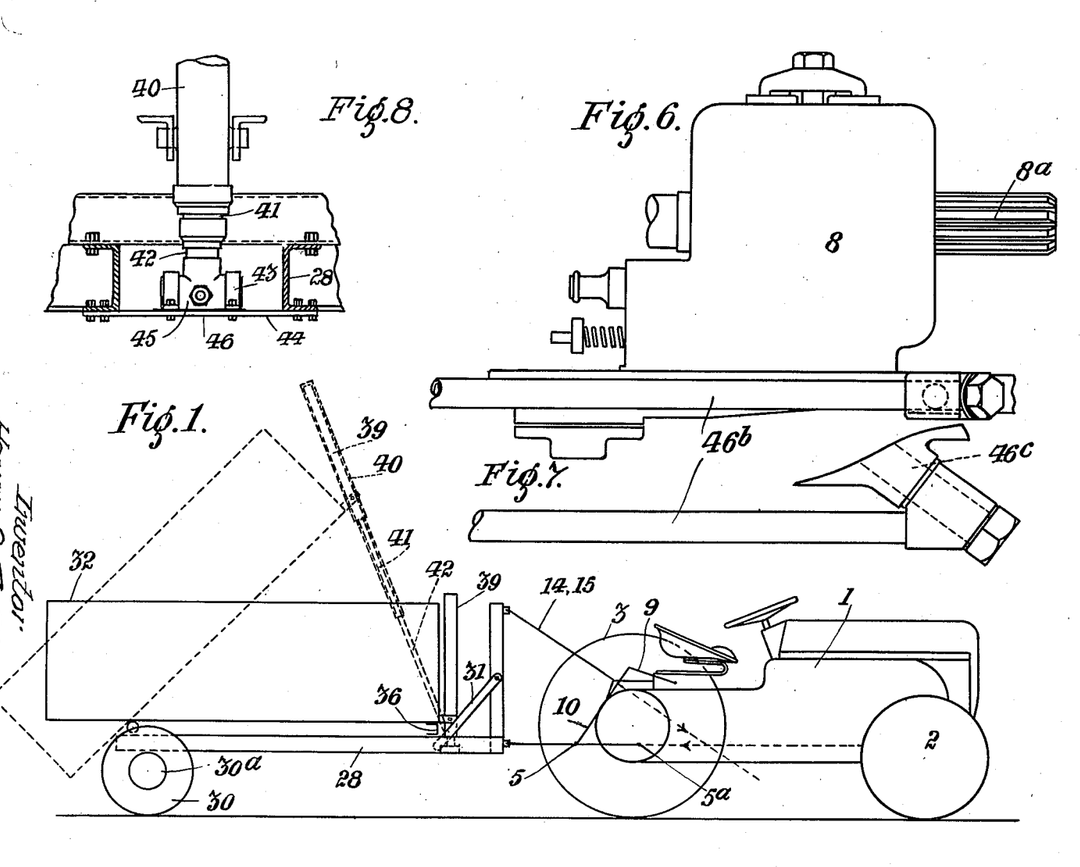
Figure 1 is a diagrammatic side elevation of an agricultural tractor with a trailer attached in accordance with the invention.
Figure 6 is a side view of the pump.
Figure 7 is a plan view of a detail thereof.
Figure 8 is a detail view to an enlarged scale on the line VIII—VIII of Figure 2.

With the arrangement described it will be seen from Figure 1 that fully two-thirds of the load receptacle 32 is located forward of axle 30ᵃ of the ground wheels 30. The trailer and its load therefore tends to dip forward and transfers a substantial part of the trailer weight on to the upper compression link 14, 15 which is so directed that its axis, when produced, passes over and, preferably quite close in front of the axis of the rear wheels of the tractor, and so transfers the unbalanced trailer weight to between the front and rear wheels of the tractor as if the trailer were actually supported and connected between these wheels, but preferably nearer the latter so that the rear wheels take most of the weight and their grip of the ground is increased, an important advantage enabling light tractors to deal with heavy loads. At the same time the weight on the front wheels is increased and improves the steering action and tends to counterbalance the lifting effect which the driving torque causes on the front wheels. The relative proportions of the unbalanced trailer weight transferred respectively to the front and rear wheels depends mainly on the inclination of the top link 14, 15, for example, the steeper the inclination the more weight is transferred to the rear wheels. This alteration can be effected without changing the trim of the trailer by altering the length of the telescopic link 14, 15 and simultaneously altering the height of the telescopic vertical member 22, 23. The trim of the trailer may be adjusted either by altering the length of the link 14, 15 or the vertical member 22, 23. The range of adjustment of the link 14, 15 is preferably such that the inclination of the link cannot be so steep as to pass behind the tractor rear axle axis or so flat as to pass over in front of the front axle axis. The lower links 5 mainly transmit the tractive pull to the trailer but are also under tension due to the unbalanced trailer weight. Therefore it is preferable to have them arranged so that their longitudinal axes lie in a horizontal plane which passes below the tractor rear axle axis and above the front axle. When so arranged they also serve to transfer some of the unbalanced trailer weight downwards on to the rear and front wheels of the tractor.

When the tractor is reversed the reversed driving torque tends to rotate the tractor downwardly at the forward end and hence to increase the weight on the front wheels and reduce that on the rear wheels with consequent loss of tractive grip. There is a further reduction in tractive grip because the resistance to movement of the trailer effects a torque reaction of members 5 and 28 upwardly at the pin 12ᵇ. This effect is due to the fact that the rearward force of the tractor is applied at a point above the trailer axle 30ᵃ which produces a turning movement of member 28 in an anti-clockwise direction, Figs. 1 and 2. Should slipping occur the weight on the back wheels can be increased by bringing the implement lifting mechanism 8—9 as disclosed for example in the abovementioned Patent 2,223,002 into action. This operation of the implement lifting mechanism 9—10 produces an upward pull on the drop links 10 tending to lift the whole trailer off the ground and consequently a corresponding downward pressure on the rear wheels 3, the stresses in the upper and lower links then becoming or tending to become respectively tensile and compressive. The same expedient can, of course, be adapted during forward movement of the tractor if necessary.

It will be understood that when the lifting mechanism is operated as above described the first effect will be to rock the trailer slightly backwards on its wheels and cause the lever 18 to rise away from the tractor casing. This in itself will cause an increase in the tractive grip of the rear wheels inasmuch as the unbalanced weight will then be entirely supported by the outer ends of the lower links 5, that is, at an advantageous leverage as regards creating tractive grip of the rear wheels. The said increase in the tractive grip arises from two causes. The first cause is that when the unbalanced weight is supported at the outer ends of the lower links 5 it takes weight off the tractor front wheels and this weight is transferred to the tractor rear wheels. Secondly, the unbalanced trailer may be regarded as a lever fulcrumed about the trailer wheel axle and it will be obvious that the downward weight or thrust on the tractor is increased by moving the point of support rearwardly to the outer ends of the links, that is, nearer to the trailer wheel axle. This increase may be sufficient to overcome slipping but, if not, an even greater increase obtains when the link 14 and lever 18 are fully extended and under tension inasmuch as the lifting mechanism is then tending to lift the whole trailer off the ground as above described.

Tipping, as indicated by the dotted position in Figure 1, is effected by supplying oil to the ram 39 from the pump 8, this operation being controlled by the hand lever controlling the raising or lowering of the implement as disclosed in abovementioned Patent No. 2,223,002 or Patent No. 2,118,180. Although this tends to lift the drop links 10 it will be understood that these do not actually raise the trailer chassis because the oil pressure is relieved in operating the ram 39. When the ram 39 has fully raised the platform the drop links 10 then start to raise or tend to raise the chassis, this fact being indicated to the operator by the lever 18 rising due to the compressive thrust in the link 14, 15 being changed to a tensile pull whereupon the operator moves the control handle to cut off supply of further oil to the ram 39. It will be seen from Figure 1 that the location of the trailer wheels 30 at the rear enables a high tipping angle as compared with known trailers having central wheels and this with small wheels 30 which enable the use of a broader load platform overhanging the road wheels without making the platform too high.

The lever 18 distributes the thrust on to the tractor casing and relieves the rod 7 and balance spring 7ª which forms part of the implement depth control. Further, it allows a certain amount of play when the trailer is being attached and facilitates the insertion of the pins 21 and 27, the front end of the trailer being supported approximately in position by a jack during this operation.

Although the link arrangement provides a rigid support for the unbalanced trailer it freely permits relative up and down angular movement between the tractor and trailer as necessitated, for instance, by uneven ground.

Figure 9:
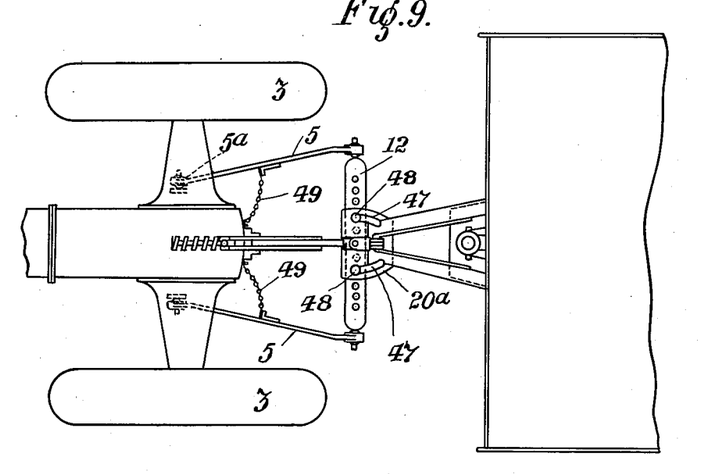
Figures 9 and 10 are respectively a plan and side elevation of a modified hitch connection.
Figure 10:
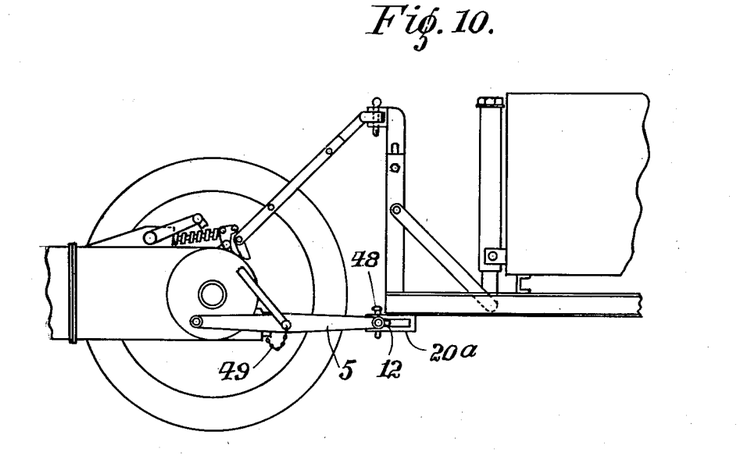

In Figs. 9 and 10 the trailer is the same as that shown in Figs. 1 to 8 except that the clevis 20ª comprises two arcuate slots 47 and it is attached to the drawbar 12 by two pins 48 passing through two of the holes 12ª in the drawbar and through the slots, the curvature of each slot being about the centre of the pin 48 when engaging the forward-end of the other slot. The linkage is the same as shown in Figs. 1 to 8 except that the check links 11 are omitted to allow lateral swinging of the lower links 5, and check chains 49 are provided, being attached to the links 5 and the rear of the tractor, to limit the lateral swinging so that the links 5 can swing close to but not touch the rear driving wheels 3. The links 5 converge forwardly and their axes when produced meet at or near the front axle or at any other point ahead of their actual connections 5ª to the tractor depending on the amount of convergence of the links. This will have the effect, as explained in my prior Patent No. 1,916,945 which shows a plough attached to the tractor, of causing the trailer to follow closely the steering of the tractor. In operation, when the tractor is steered to right or left the links will, as a result, swing respectively to right or left relatively to the tractor and the trailer will closely follow the steering thereof. In the event of a sharper turn than that allowed by the check chains 49 being necessary, the trailer can assume a greater angle relatively to the tractor by virtue of the slots 47. For example, if the trailer is steered to the right (Fig. 9) the links 5 will swing to the right relatively to the trailer to the limit allowed by the right hand check chain 49 and then, if the sharpness of the turn demands, the trailer can swing, or assume an angle, further to the right with reference to the tractor by virtue of the end of the left hand slot 47 swinging about the corresponding left hand pin 48 while the right hand slot advances past its corresponding pin. The extent of the supplementary swinging movement is determined by the angle subtended by the slots.

It will be understood that the invention is applicable to any trailable device wherein there is a resultant downwardly acting load or weight in front of the ground support means which is capable of being transferred to the tractive vehicle.

What I claim is:

1. In combination a tractor for agricultural or soil-working implements having, a power unit, front wheels and rear driving wheels, and upper and lower attachment means at the rear, a trailer comprising a chassis having two road wheels at or near the rear thereof and upper and lower attachment means at the forward end, and a hitch connection between the tractor and trailer comprising an upper link pivotally attached to the upper attachment means on the tractor and trailer and inclined so that an axial projection passing through said upper attachment means passes over the axis of the tractor rear driving wheels and below the axis of the tractor front wheels, lower link means pivotally connected to the lower attachment means on the tractor and trailer and a connection between said power unit and lower links whereby an upward pull can be exerted on the latter, the attachment of the link means to the trailer allowing lateral swinging of same with reference to the tractor about a vertical axis spaced rearwardly from the tractor to give the necessary clearance for turning and the upper and lower links forming part of a quadrilateral structure allowing free up and down movement between the tractor and trailer but tending to lift the trailer off the ground when the power unit is operated to exert an upward force on the links.

2. In combination a tractor having rear driving wheels, triangularly spaced attachment points at the rear for hitch links, and a power unit including a fluid pump for raising and lowering the links; an unbalanced trailer comprising a chassis having road wheels at or near the rear and upper and lower vertically aligned attachment means at the front, and a load-receiving platform having the major part of its load-receiving surface in front of the axis of said road wheels; and a hitch connection between said trailer and tractor comprising an upper link pivotally attached to said upper attachment means on the trailer and to one of the attachment points on the tractor, the upper attachment means on the trailer being located above the attachment point on the tractor so that the link is inclined downwardly to the tractor and its axial projection passing through said upper attachment means and said attachment point passes over and down in front of the axis of the tractor rear wheels, two lower laterally spaced links universally attached to the tractor at the two other attachment points, a cross bar connecting the rear ends of said links and engageable with the lower attachment means on the trailer, and check links connected to the tractor and to the lower links to prevent lateral but not vertical swinging of the latter.

3. The combination as claimed in claim 2, in which the upper and lower attachment means on the trailer each comprise a clevis on a telescopically adjustable vertical member, and wherein the upper link comprises two axially adjustable parts, one pivotally connected to an intermediate point of a short lever pivotally connected at one end to the attachment point on the tractor, the other part being pivotally connected to a member pivotally connected by vertical pin means to the upper clevis, the lower clevis being pivotally connected with the cross bar by vertical pin means in vertical alignment with the first mentioned pin means.

4. The combination as claimed in claim 2, wherein the height of the lower attachment means on the trailer with reference to the height of the lower attachment points on the tractor is such that the lower links are directed so that their longitudinal axis lie in a horizontal plane passing under the axis of the tractor rear wheels and over the axis of the tractor front wheels.

5. A tractor for pulling and supporting a two-wheeled trailer having the wheels located well behind the centre of gravity of the trailer, comprising an upper attachment point for detachable connection of an upper thrust link, two lower laterally spaced points for the universal attachment of draft links, two further attachment points in the same horizontal axis as said lower points for attachment of check links attachable to said lower links to prevent lateral swinging thereof, a power unit for raising and lowering said lower links including a pump driven by the tractor engine, a conduit leading from the delivery side of said pump and coupling means thereon for detachable connection to a conduit on the trailer.

6. A tractor for pulling and supporting an unbalanced trailable device adapted to transfer unbalanced weight or load on to the tractor, comprising three triangularly spaced attachment points at the rear thereof for pivotal attachment of hitch links also adapted for attachment to the trailable device, the upper of the links serving to transmit the unbalanced weight or load as a thrust on to the tractor and the lower serving to transmit the pull to the trailable device, means for preventing lateral swinging of said links and a power unit on the tractor for raising said links.

7. A tractor as claimed in claim 6, in which said power unit includes a pump driven by the tractor engine, a conduit leading from the delivery side of said pump and coupling means thereon for detachable connection to a conduit on the trailable device.

8. A tractor for pulling and supporting a two-wheeled trailer having the wheels located well behind the centre of gravity of the trailer, comprising an upper attachment point for detachable connection of an upper thrust link, two lower laterally spaced points for the universal attachment of draft links, means for preventing lateral swinging of said links, a power unit for raising and lowering said lower links including a pump driven by the tractor engine, a conduit leading from the delivery side of said pump and coupling means thereon for detachable connection to a conduit on the trailer.

9. In combination a tractor for agricultural or soil-working implements having upper and lower attachment means at the rear, a trailer comprising a chassis having two road wheels at or near the rear thereof and upper and lower attachment means in vertical alignment at the forward end, and a hitch connection between the tractor and trailer comprising an upper link having a pivotally attached lever at its forward end, which lever is pivotally attached to the upper attachment means on the tractor and adapted to bear against the rear of the tractor under the thrust of the upper link which is inclined so that its axial projection passes over the axis of the tractor rear driving wheels and below the axis of the tractor front wheels and lower link means connected to the lower attachment means on the tractor and trailer, the attachment of the link means to the trailer allowing lateral swinging of same with reference to the tractor about a vertical axis spaced rearwardly from the tractor to give the necessary clearance for turning.

10. In combination a tractor for agricultural or soil-working implements having upper and lower attachment means at the rear, a trailer comprising a chassis having two road wheels at or near the rear thereof and upper and lower attachment means at the forward end, and a hitch connection between the tractor and trailer comprising an upper link pivotally attached to the upper attachment means on the tractor and trailer and inclined so that an axial projection passing through said upper attachment means passes over the axis of the tractor rear driving wheels and below the axis of the tractor front wheels and lower link means comprising two laterally spaced links universally attached to the tractor, a cross member attached at the outer ends of said links and adapted to engage the lower attachment means on the trailer, and means for preventing lateral swinging of said links, the attachment of the upper link and cross member to the trailer allowing lateral swinging of same with reference to the tractor about a vertical axis spaced rearwardly from the tractor to give the necessary clearance for turning.

11. In combination a non-self-balancing trailer including ground wheels and adapted to receive a major part of its load in front of the ground wheels, a tractive vehicle including front and rear wheels, a hitch connection for connecting the trailer to the tractive vehicle comprising upper and lower link means connected at their forward ends to the tractive vehicle, the connections of the upper link means to the tractive vehicle and trailer being located so that the said means transmits the unbalanced weight of the trailer as a thrust directed down between the axes of the rear and front wheels of the tractive vehicle, the connections of said links with the vehicle and trailer being universal to permit relative up and down movement between the trailer and vehicle and said lower link means comprising forwardly convergent links universally attached at their forward ends to the tractive vehicle and to a cross member at their rear ends, to allow lateral swinging of said member relatively to the tractive vehicle about a point forward of the actual connections of the links to the tractive vehicle, check means to limit said lateral swinging and two laterally spaced pivotal connections between the cross member and the trailer allowing right or left hand swinging of the trailer with reference to the said mmbr supplementary to the swinging between said member and the tractive vehicle.

12. In combination a non-self-balancing trailer including ground wheels and adapted to receive a major part of its load in front of the ground wheels, a tractive vehicle including front and rear wheels, a hitch connection for connecting the trailer to the tractive vehicle comprising upper and lower link means connected at their forward ends to the tractive vehicle, the connections of the upper link means to the tractive vehicle and trailer being located so that the said means transmits the unbalanced weight of the trailer as a thrust directed down between the axes of the rear and front wheels of the tractive vehicle, the connections of said links with the vehicle and trailer being universal to permit relative up and down movement between the trailer and vehicle and said lower link means comprising forwardly convergent links universally attached at their forward ends to the tractive vehicle and to a cross member at their rear ends, to allow lateral swinging of said member relatively to the tractive vehicle about a point forward of the actual connections of the links to the tractive vehicle, check means to limit said lateral swinging, a clevis on the trailer having two laterally spaced arcuate slots each centred about the forward end of the other and pin means for pivotally connecting each slot with the cross member.

13. In combination a non-self-balancing trailer including ground wheels, a tippable load platform having the major part of its load-receiving area located in front of said road wheels, and tipping means for tipping said platform, a tractive vehicle including front wheels and rear driving wheels, hitch means connecting the trailer to the tractive vehicle comprising upper link means adapted under compression to impose a thrust against the tractive vehicle and so directed as to transfer the unbalanced trailer weight on to the tractive vehicle as if the trailer were supported in front of the axis of said rear wheels but adapted under tension to have a limited movement away from the vehicle, and lower link means, and a pressure fluid power unit on the vehicle for lifting said link means and connected to said tipping means, the said upper link means moving away from the vehicle when the platform has been fully raised and said power unit is tending to lift the link means and the entire trailer.

14. The combination as claimed in claim 13, in which said upper link means comprises a link adapted to impose a thrust at one end against the vehicle and a short link pivotally connected to said end and to the vehicle.

15. In combination a trailer, a tractive vehicle including front steering wheels and rear wheels and hitch means connecting the trailer to the vehicle comprising laterally spaced links attached to the rear of the vehicle and attached to the trailer to allow relative lateral angular movement of the trailer with reference to the vehicle, the attachment points of said links lying in vertical planes which converge forwardly to meet on or near a vertical line forward of the points of connections of the links to the vehicle so that the trailer acts as if actually connected at said line of convergence.

16. In combination a tractor for soil-working implements having a power unit, front wheels and rear driving wheels and upper and lower attachment means at the rear, a non-self-balancing trailable device including ground-engaging support means and adapted to have the resultant of its downwardly acting weight or load in front of the support means and having upper and lower attachment means at its forward end, and a hitch connection between the tractor and device comprising an upper link pivotally attached to the upper attachment means on the tractor and device and inclined so that an axial projection passing through said upper attachment means passes over the axis of the tractor rear driving wheels and below the axis of the tractor front wheels, lower link means pivotally connected to the lower attachment means on the tractor and device and a connection between said power unit and lower links whereby an upward pull can be exerted on the latter, the attachment of the link means to the device allowing lateral swinging of same with reference to the tractor about a vertical axis spaced rearwardly from the tractor to give the necessary clearance for turning and the upper and lower links forming part of a quadrilateral structure allowing free up and down movement between the tractor and device but tending to lift the device off the ground when the power unit is operated to exert an upward force on the links.

17. In combination a tractor for soil-working implements having a power unit, front wheels and rear driving wheels and upper and lower attachment means at the rear, a non-self-balancing trailable device including ground-engaging support means and adapted to have the resultant of its downwardly acting weight or load in front of the support means and having upper and lower attachment means at its forward end, and a hitch connection between the tractor and device comprising an upper link pivotally attached to the upper attachment means on the tractor and device and inclined so that an axial projection passing through said upper attachment means passes over the axis of the tractor rear driving wheels and below the axis of the tractor front wheels, lower link means swingably connected to the lower attachment means on the device and a connection between said power unit and lower links whereby an upward pull can be exerted on the latter, the attachment of the link means to the device allowing lateral swinging of same with reference to the tractor, and the upper and lower links forming part of a quadrilateral structure allowing free up and down movement between the tractor and device but tending to lift the device off the ground when the power unit is operated to exert an upward force on the links.

18. In combination a non-self-balanced trailable device having ground-engaging support means and having the centre or resultant of its downwardly acting weight or load in front of said support means, a tractive vehicle including front wheels and rear driving wheels and a power unit, and a hitch connection comprising an upper and lower pivotal link connection means between the tractive vehicle and trailable device to allow relative up and down movement therebetween and a connection between said lower link connection means and said power unit, the upper and lower link connection means being normally respectively under compression and tension due to said downwardly acting load or weight and applying same to the tractive vehicle forward of the actual points of connection of said link connection means to the tractive vehicle, and means for transferring said weight or load to the actual connection of said lower link connection means to the trailable device when the power unit is operated to cause an upward force on said lower link connection means.

19. The combination as claimed in claim 23 in which said upper link means comprises a link pivotally associated with the rear of the tractive vehicle and directed so as to apply its compressive load as a thrust passing down in front of the axis of the rear wheels.

20. The combination as claimed in claim 23, in which said upper link means comprises a link pivotally connected to the trailable device and to a further link which is pivotally connected to the rear of the vehicle and adapted normally to bear against and transmit a thrust to the vehicle but capable of moving away from the vehicle to relieve the thrust when the power unit is operated to raise the lower links.

21. A non-self-balancing trailable device including ground-engaging support means and adapted to have the centre or resultant of its downwardly acting weight or load in front thereof, a tractive vehicle including front wheels and rear driving wheels and a hitch connection comprising lower hitch links pivotally connected to the vehicle and device to allow relative up and down movement, an upper thrust-transmitting member connected to the device and adapted to transmit a thrust due to said weight or load against the rear of the vehicle but capable of movement away from the vehicle and means for raising said lower links and causing said member to move away from the vehicle.

22. In combination a non-self-balanced trailable device having ground-engaging support means and having the center or resultant of its downwardly acting weight or load in front of said support means, a tractive vehicle including front wheels and rear driving wheels and a power unit, and a hitch connection comprising an upper and lower pivotal link connection means between the tractive vehicle and trailable device to allow relative up and down movement therebetween and a connection between said lower link connection means and said power unit, the upper and lower link connection means being normally respectively under compression and tension due to said downwardly acting load or weight and applying same to the tractive vehicle forward of the actual points of connection of said link connection means to the tractive vehicle, said upper link connection means being extensible to allow the trailable device to tip rearwardly and release the thrust of said means on the tractive vehicle when an upward force is exerted on the lower link connection means.

23. In combination a trailable device having ground-engaging support means and having the center or resultant of its downwardly acting weight or load in front of said support means, a tractive vehicle including front wheels and rear driving wheels and a power unit, and a hitch connection comprising upper and lower link means having pivotal connections with the vehicle and trailable device to allow relative up and down movement therebetween and a connection between said lower link means and the power unit whereby said means can be raised, the upper and lower link means normally being respectively under compression and tension due to said downwardly acting load or weight and said upper link means being extensible to allow rearward rocking of the trailable device about said support means when the lower links are raised by the power unit so that the said downwardly acting weight or load is taken from said upper link means and is then borne at the pivotal connection of the lower link means with the trailable device.

24. In combination a non-self-balancing mobile device including ground-engaging support means, and having the center or resultant of its downwardly acting load or weight spaced from said support means, a tractive vehicle, upper and lower hitch link means pivotally connected to the device and vehicle to allow relative up and down movement and normally being respectively under compression and tension due to said load or weight, means for raising said lower hitch link means and said upper link means being extensible to relieve the vehicle of the thrust when the lower hitch link means is raised so that the said load or weight is then supported at the pivotal connection of the lower link means to said device.

HENRY GEORGE FERGUSON.